United States Patent
Han

(10) Patent No.: US 12,457,343 B2
(45) Date of Patent: *Oct. 28, 2025

(54) METHOD AND APPARATUS FOR DETERMINING VIDEO BITRATE, COMPUTER DEVICE, AND STORAGE MEDIUM

(71) Applicant: Tencent Technology (Shenzhen) Company Limited, Shenzhen (CN)

(72) Inventor: Haixu Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,879

(22) Filed: May 13, 2024

(65) Prior Publication Data

US 2024/0298005 A1 Sep. 5, 2024

Related U.S. Application Data

(63) Continuation of application No. 17/517,588, filed on Nov. 2, 2021, now Pat. No. 12,022,089, which is a
(Continued)

(30) Foreign Application Priority Data

Dec. 26, 2019 (CN) .......................... 201911366575.4

(51) Int. Cl.
*H04N 19/00* (2014.01)
*H04N 19/105* (2014.01)
(Continued)

(52) U.S. Cl.
CPC ......... *H04N 19/146* (2014.11); *H04N 19/105* (2014.11); *H04N 19/137* (2014.11);
(Continued)

(58) Field of Classification Search
CPC .............. H04N 19/146; H04N 19/105; H04N 19/137; H04N 19/159; H04N 19/176; H04N 19/40

See application file for complete search history.

(56) References Cited

U.S. PATENT DOCUMENTS 8,767,825 B1 * 7/2014 Wang ................... H04N 19/115
375/240.1
2011/0002381 A1 * 1/2011 Yang ..................... H04N 19/124
375/240.03
(Continued)

FOREIGN PATENT DOCUMENTS

CN 105187835 A 12/2015
CN 107659819 A 2/2018
(Continued)

OTHER PUBLICATIONS

Han et al. "CN 109788316A Translation". May 21, 2019. (Year: 2019).*
(Continued)

*Primary Examiner* — Zhihan Zhou
(74) *Attorney, Agent, or Firm* — Morgan, Lewis & Bockius LLP

(57) ABSTRACT

Embodiments of the present disclosure relate to a method for determining a video bitrate for a to-be-transcoded video performed by a computer device. The method includes: selecting target video frames from video frames of a to-be-transcoded video; determining bitrate feature information of the target video frames; and determining a target video bitrate of the to-be-transcoded video according to the bitrate feature information of the target video frames and bitrate requirement information of a target service platform, the target service platform being a service platform to which the to-be-transcoded video is to be played after being transcoded.

15 Claims, 5 Drawing Sheets

Related U.S. Application Data continuation of application No. PCT/CN2020/117370, filed on Sep. 24, 2020.

(51) Int. Cl.
 *H04N 19/137* (2014.01)
 *H04N 19/146* (2014.01)
 *H04N 19/159* (2014.01)
 *H04N 19/176* (2014.01)
 *H04N 19/40* (2014.01)

(52) U.S. Cl.
 CPC ......... *H04N 19/159* (2014.11); *H04N 19/176* (2014.11); *H04N 19/40* (2014.11)

(56) References Cited

U.S. PATENT DOCUMENTS

| | | | | |
|---|---|---|---|---|
| 2013/0094565 A1* | 4/2013 | Yang | ................. | H04N 19/154 375/E7.126 |
| 2015/0350726 A1* | 12/2015 | Tan | ................. | H04N 19/136 348/441 |
| 2015/0373351 A1 | 12/2015 | Laksono et al. | | |
| 2019/0320193 A1* | 10/2019 | Mao | ................. | H04N 19/172 |

FOREIGN PATENT DOCUMENTS

| | | |
|---|---|---|
| CN | 107846590 A | 3/2018 |
| CN | 109561310 A | 4/2019 |
| CN | 109660825 A | 4/2019 |
| CN | 109788316 A | 5/2019 |
| CN | 110062262 A | 7/2019 |
| CN | 111193924 A | 5/2020 |

OTHER PUBLICATIONS

Jiang et al. "CN 107846590A Translation". (Year: 2018).*
Extended European Search Report, EP20907233.9, Oct. 31, 2022, 8 pgs.
Tencent Technology, European Office Action, EP Patent Application No. 20907233.9, May 17, 2024, 5 pgs.
Tencent Technology, ISR/WO, PCT/CN2020/117370, Dec. 30, 2020, 6 pgs.
Tencent Technology, IPRP, PCT/CN2020/117370, Jun. 28, 2022, 5 pgs.

* cited by examiner

METHOD AND APPARATUS FOR DETERMINING VIDEO BITRATE, COMPUTER DEVICE, AND STORAGE MEDIUM

CROSS-REFERENCE TO RELATED APPLICATIONS

This application is a continuation application of U.S. patent application Ser. No. 17/517,588, entitled "METHOD AND DEVICE FOR DETERMINING VIDEO BITRATE, COMPUTER APPARATUS, AND STORAGE MEDIUM" filed on Nov. 2, 2021, which is a continuation application of PCT Patent Application No. PCT/CN2020/117370, entitled "METHOD AND DEVICE FOR DETERMINING VIDEO BITRATE, COMPUTER APPARATUS, AND STORAGE MEDIUM" filed on Sep. 24, 2020, which claims priority to Chinese Patent Application No. 201911366575.4, filed with the State Intellectual Property Office of the People's Republic of China on Dec. 26, 2019, and entitled "METHOD AND APPARATUS FOR DETERMINING VIDEO BITRATE, COMPUTER DEVICE, AND STORAGE MEDIUM", all of which are incorporated herein by reference in their entirety.

FIELD OF THE TECHNOLOGY

Embodiments of the present disclosure relate to the field of video transcoding technologies, and in particular, to a method and an apparatus for determining a video bitrate, a computer device, and a storage medium.

BACKGROUND OF THE DISCLOSURE

With the development of network video technologies, video coding and decoding technologies have emerged. Through video coding and decoding, videos can be played on different devices and propagated between different devices. To adapt to different video playing scenarios, it is necessary to determine a video bitrate required for a video, to perform processing such as transcoding on the video. A conventional method for determining a video bitrate is to obtain a parameter of a video according to an existing video data stream, and determine a video bitrate by using a model relationship of a quality factor such as a PSNR. Alternatively, a scene analysis method based on machine learning is used to recognize different scenes or different complexity degrees of scenes, to determine a video bitrate.

In a process of implementing embodiments of the present disclosure, the inventor finds that the conventional method has at least the following problems: An input video stream needs to be completely decoded to perform processing such as model estimation and scene texture recognition on a frame of image. Consequently, a process of determining a video bitrate is relatively complex, which leads to low efficiency in determining a video bitrate.

The information disclosed in the above background section is used only to enhance understanding of the background of the embodiments of the present disclosure, and therefore may include information that does not constitute the related art known to persons of ordinary skill in the art.

SUMMARY

According to embodiments provided in this application, a method and an apparatus for determining a video bitrate, a computer device, and a storage medium are provided.

In an embodiment, a method for determining a video bitrate is performed by a computer device, the method including the following operations: selecting target video frames from video frames of a to-be-transcoded video according to an interval determining a pre-estimated video bitrate of the to-be-transcoded video according to bitrate feature information of the target video frames; obtaining a first relative relationship between the pre-estimated video bitrate and an actual video bitrate of the to-be-transcoded video; and determining a target video bitrate of the to-be-transcoded video according to the first relative relationship and bitrate requirement information of a target service platform.

In an embodiment, the present disclosure provides a computer device, including a memory and a processor, the memory storing computer-readable instructions, and the processor executing the computer-readable instructions to implement the following operations: selecting target video frames from video frames of a to-be-transcoded video according to an interval determining a pre-estimated video bitrate of the to-be-transcoded video according to bitrate feature information of the target video frames; obtaining a first relative relationship between the pre-estimated video bitrate and an actual video bitrate of the to-be-transcoded video; and determining a target video bitrate of the to-be-transcoded video according to the first relative relationship and bitrate requirement information of a target service platform.

In an embodiment, the present disclosure provides a non-transitory computer-readable storage medium storing one or more computer-readable instructions, the computer-readable instructions being executed by a processor to implement the following operations: selecting target video frames from video frames of a to-be-transcoded video according to an interval; determining a pre-estimated video bitrate of the to-be-transcoded video according to bitrate feature information of the target video frames; obtaining a first relative relationship between the pre-estimated video bitrate and an actual video bitrate of the to-be-transcoded video; and determining a target video bitrate of the to-be-transcoded video according to the first relative relationship and bitrate requirement information of a target service platform.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following description show merely some embodiments of this application, and a person of ordinary skill in the art may obtain other accompanying drawings from these accompanying drawings without creative efforts.

DESCRIPTION OF EMBODIMENTS

To make the objectives, technical solutions, and advantages of the embodiments of the present disclosure clearer and more comprehensible, the following further describes the embodiments of the present disclosure in detail with reference to the accompanying drawings and embodiments. It should be understood that, the specific embodiments described herein are merely used for explaining the embodiments of the present disclosure but are not intended to limit the embodiments of the present disclosure.

Embodiment mentioned in the specification means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments.

Figure 1:
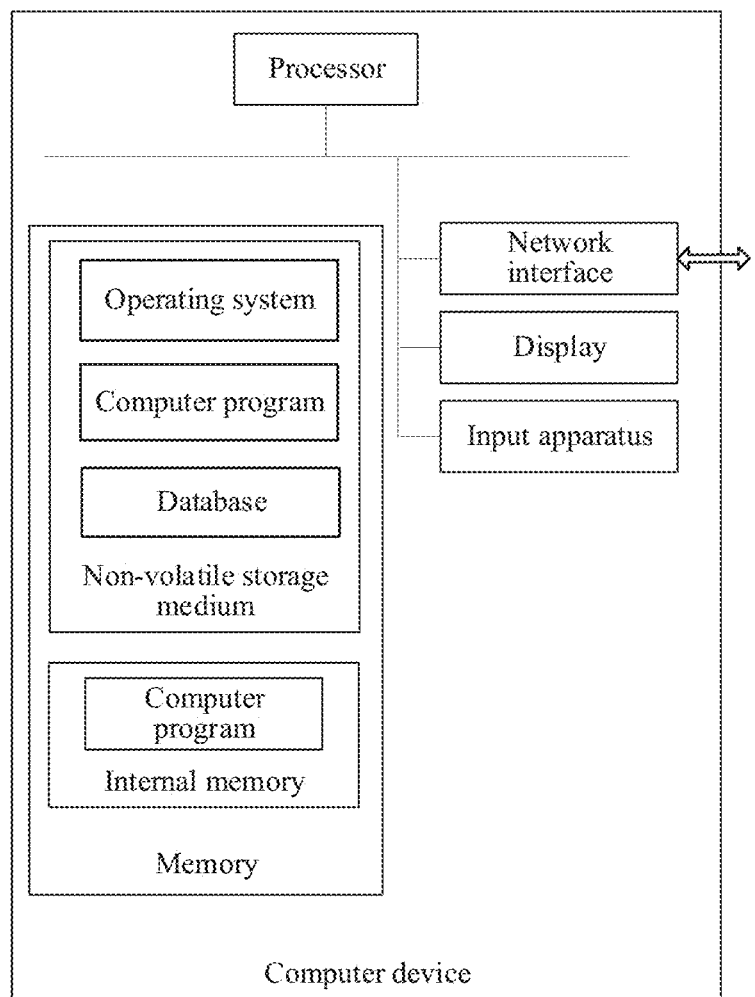
FIG. 1 is a diagram of an application environment of a method for determining a video bitrate according to an embodiment.

A method for determining a video bitrate according to this application may be applied to a computer device shown in FIG. 1. The computer device may be a server, or may be a terminal device. A diagram of an internal structure of the computer device may be shown in FIG. 1. The computer device includes a processor, a memory, a network interface, a display screen, and an input apparatus that are connected by using a system bus. The processor is configured to provide computing and control capabilities. The memory includes a non-transitory computer-readable storage medium and an internal memory. The non-transitory computer-readable storage medium stores an operating system, computer-readable instructions, and a database. The computer-readable instructions are executed by the processor to implement a method for determining a video bitrate. The internal memory provides an environment to run the operating system and the computer-readable instructions in the non-transitory computer-readable storage medium. The database is configured to store data in a process of performing the method for determining a video bitrate. For example, the database may store data such as bitrate feature information and a pre-estimated video bitrate. The network interface is configured to communicate with an external terminal through a network connection, for example, connected to a client, and configured to send a transcoded video to the client. The display may be a liquid crystal display or an electronic ink display. The input apparatus may be a touch layer covering the display, or may be a button, a trackball, or a touchpad disposed on a housing of the computer device, or may be an internal keyboard, touchpad, mouse, or the like. In an embodiment, the terminal device may be, but is not limited to, various personal computers (PCs), notebook computers, smartphones, tablet computers, and portable wearable devices. The server may be implemented by using an independent server or a server cluster including a plurality of servers.

A person skilled in the art may understand that, the structure shown in FIG. 1 is only a block diagram of a part of a structure related to a solution of this application and does not limit the computer device to which the solution of this application is applied. Specifically, the computer device may include more or fewer components than those in the drawings, or some components are combined, or a different component deployment is used.

The embodiments of this application provide a method for determining a video bitrate and apparatus, a computer device, and a storage medium.

Figure 2:
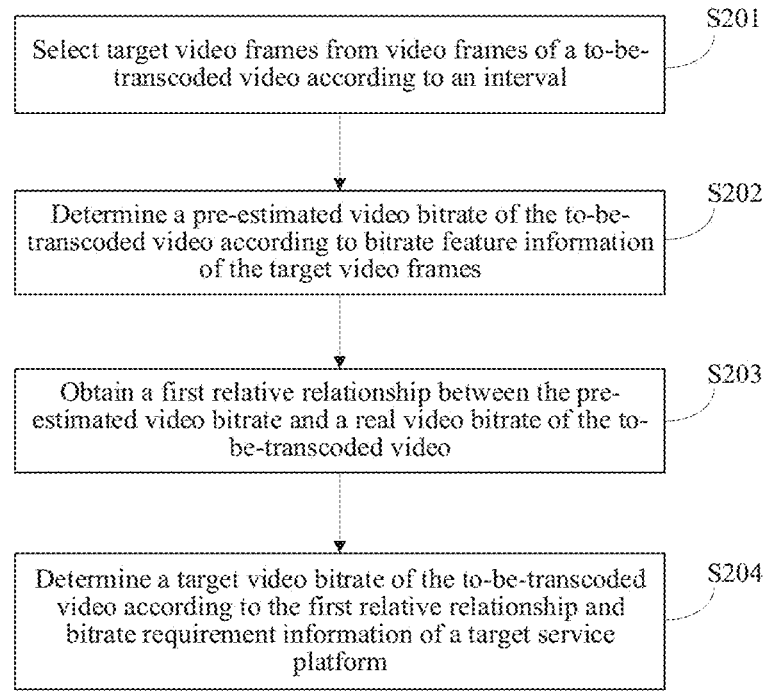
FIG. 2 is a schematic flowchart of a method for determining a video bitrate according to an embodiment.

In an embodiment, as shown in FIG. 2, a method for determining a video bitrate is provided. The following provides a detailed description by using an example that the method is applied to the computer device in FIG. 1. The method includes the following steps:

S201. Select target video frames from video frames of a to-be-transcoded video according to an interval.

The video in this embodiment of the present disclosure may be various video files that can be played and watched by using the computer device. The bitrate is an amount of data transmitted in a unit time during video data transmission. To ensure video file sharing, exchanging, or playing on different devices, a video sometimes requires processing such as transcoding. The video transcoding is converting a compressed and coded video data stream into another video data stream according to a specific coding standard, a bitrate, or other conditions, that is, a process of first decoding and then coding a video file. The to-be-transcoded video may be a video requiring transcoding processing. In a transcoding process, the to-be-transcoded video is converted from an initial video bitrate to a target video bitrate. A type of the to-be-transcoded video may be HEVC, H.264/AVC, MPEGx, or the like. In addition, the to-be-transcoded video may be uploaded by a client, or may be sent by a video server that manages videos. When sending the to-be-transcoded video, the client or the video server may also send a bitrate (an actual video bitrate) of the to-be-transcoded video to the computer device.

In an embodiment, the to-be-transcoded video generally includes a plurality of video frames. In this step, at least one target video frame is selected from the video frames of the to-be-transcoded video in a specific selection manner according to a predefined interval.

The selection at an interval may be selecting at least one target video frame from the video frames of the to-be-transcoded video according to a frame quantity interval N. The frame quantity interval N may be adjusted according to a machine capability and a complexity requirement in an actual scenario. If the adaptive bitrate setting method is required to have a low latency and low complexity, N may have a relatively value; otherwise, N has a relatively small value (in some embodiments, N may even have a value of 1). During the selection at an interval, the frame quantity interval may be fixed, or may dynamically change. If dynamically changing, the frame quantity interval may change randomly, or may change regularly. For example, for a video climax part (which is generally a middle part), the frame quantity interval may have a relatively small value. In a specific example, for a 50-minute video, the first 10 minutes may have a frame quantity interval of 20, the middle 30 minutes may have a frame quantity interval of 5, and the last 10 minutes may have a frame quantity interval of 15. In an embodiment, frame quantity intervals corresponding to different to-be-transcoded videos may be the same or may be different.

In an embodiment, selected video frames are used as the target video frames. A quantity of the target video frames may be not fixed. To ensure operation efficiency, the quantity of the target video frames may be less than a total quantity of the video frames of the to-be-transcoded video. In an embodiment, a fixed quantity of target video frames may alternatively be selected from the video randomly or in a specific selection manner.

As the target video frames are selected from the to-be-transcoded video according to a predefined interval, rapid selection is implemented in the video frames, and not all the video frames of the to-be-transcoded video need to be processed, thereby effectively improving efficiency in determining a video bitrate.

A process of selecting a target video frame from the to-be-transcoded video may also be referred to as frame skipping decision process, whose specific implementation process may be as follows:

Assuming that one frame is selected every N frames, and frame skipping decision is performed on an $i^{th}$ frame, if i is an integer multiple of N, the $i^{th}$ frame is used as a target video frame for next processing; otherwise, the frame is directly skipped and frame skipping decision is performed on a next frame. An implementation formula of the frame skipping decision may be as follows:

$$\text{skip}_i = \begin{cases} 1 & i \% N = 0 \\ 0 & i \% N \neq 0 \end{cases}$$

"%" means obtaining a remainder, i represents a number of a current studied frame, $\text{skip}_i=1$ means selected (that is, used as a target video frame), and $\text{skip}_i=0$ means not selected.

In an embodiment, decoding processing such as entropy decoding processing may be performed on the target video frame. After the entropy decoding processing, feature information related to video transcoding may be extracted from the video frame for subsequent transcoding processing.

Once a target video frame is selected, a subsequent process of determining a video bitrate may be performed. If a video bitrate satisfying a requirement can be obtained according to the current selected target video frame, the process of selecting a target video frame may be stopped. On the contrary, if an obtained video bitrate does not satisfy the requirement, the process of selecting a target video frame may be continued, and video bitrate calculation is continued according to a newly selected target video frame. In an embodiment, all (or some) of the video frames of the to-be-transcoded video may alternatively be traversed to select all target video frames, and then the subsequent process of determining a video bitrate is performed.

S202. Determine a pre-estimated video bitrate of the to-be-transcoded video according to bitrate feature information of the target video frames.

The bitrate feature information is feature information of the to-be-transcoded video in coding and decoding processes, which may be used to represent texture complexity of the to-be-transcoded video, and may specifically include video resolution, an intra-frame prediction proportion Intra, a motion vector residual Mvd, a quantization factor QP, and the like. The intra-frame prediction proportion may be a proportion of coded blocks in an intra-frame prediction mode (which is a coding mode in which a current coded block is predicted by using a coded pixel in a current video frame in a video coding process, to effectively remove spatial redundancy) in coded blocks of a corresponding video frame. The motion vector residual may be a difference between an actual motion vector value and a predicted motion vector value when inter-frame prediction is adopted for video coding, which is used to represent a relative relationship between a current coded block and a predicted block of an adjacent frame. The quantization factor (which may also be referred to as a quantization parameter) may be a number of a quantization step, whose value can control a value of a bitrate for video compression and output. A larger QP indicates a smaller bitrate. In an embodiment, the bitrate feature information may be QP.

The pre-estimated video bitrate is a video bitrate obtained based on the bitrate feature information of the target video frames according to a specific bitrate calculation method. Specifically, the pre-estimated video bitrate is a bitrate determined according to some video frames (the target video frames) extracted from the to-be-transcoded video, which can reflect the bitrate of the to-be-transcoded video to some extent.

S203. Obtain a first relative relationship between the pre-estimated video bitrate and an actual video bitrate of the to-be-transcoded video.

The actual video bitrate is an actual bitrate of the to-be-transcoded video, and may be sent when the client or the video server sends the to-be-transcoded video to the computer device. If the client or the video server does not provide bitrate information of the to-be-transcoded video, the computer device may alternatively perform bitrate analysis on the to-be-transcoded video when obtaining the to-be-transcoded video, and use an initial video bitrate obtained through the bitrate analysis as the actual video bitrate of the to-be-transcoded video.

The relative relationship may be relative values, a difference, or the like between the pre-estimated video bitrate and the actual video bitrate. In an embodiment, the difference between the two may be compared with a pre-determined relative relationship evaluation range (which may be a pre-determined fixed range, or may be a dynamic range calculated according to the pre-estimated video bitrate). Alternatively, the two may be compared directly (or after multiplied by weight coefficients). Different processing may be performed for different comparison results: 1. If the difference is within a controllable range (for example, an absolute value of the difference is within the relative relationship evaluation range), the to-be-transcoded video may be directly transcoded according to a specific video compression method, to obtain a transcoded video satisfying a requirement. 2. In some cases, the to-be-transcoded video has excessively high or low quality (which may refer to texture complexity of the video) (for example, an absolute value of the difference is beyond the relative relationship evaluation range), which indicates that the difference is within an uncontrollable range. If transcoding is still performed according to a conventional video compression method, the transcoding requires an excessively long time or an obtained transcoded video has excessively low quality. Therefore, it is necessary to determine quality of the to-be-transcoded video according to the relative relationship between the pre-estimated video bitrate and the actual video bitrate, to perform pertinent transcoding.

Therefore, in this step, the first relative relationship between the pre-estimated video bitrate and the actual video bitrate of the to-be-transcoded video is determined, so that a video bitrate is subsequently determined pertinently according to the first relative relationship.

S204. Determine a target video bitrate of the to-be-transcoded video according to the first relative relationship and bitrate requirement information of a target service platform. The target service platform may be a service platform to which the to-be-transcoded video is applied after being transcoded.

The target service platform may be various types of platforms that can perform service processing such as playing, propagating, and processing a transcoded video, which may be an application program such as WeChat or a video player. The bitrate requirement information may be a requirement on a bitrate when the target service platform performs service processing on the video, and the bitrate requirement information may be determined according to a configuration information, an attribute, a service requirement, or the like of the target service platform. Specifically, for the configuration information, the bitrate requirement information may be determined according to a RAM or the like. For example, a large RAM indicates that corresponding bitrate requirement information may be "requiring a relatively large video bitrate". For the attribute, the bitrate requirement information may be determined according to a type of the target service platform, an attribute of a terminal on which the target service platform is located, or the like. For example, bitrate requirement information corresponding to a PC terminal may be "requiring a higher video bitrate", while bitrate requirement information corresponding to a mobile terminal may be "requiring a lower video bitrate". Alternatively, the bitrate requirement information may be determined according to a bandwidth upper limit and lower limit of a network environment. For the service requirement, the bitrate requirement information may be determined according to a service requirement such as a specific service form. For example, bitrate requirement information corresponding to online video playing in a video player may be "requiring a higher video bitrate", while bitrate requirement information corresponding to video playing in Moments may be "requiring a lower video bitrate". The target video bitrate obtained according to the bitrate requirement information allows for the requirement of the target service platform on the bitrate, so that an obtained transcoded video can be well transmitted and run in the target service platform.

With the method for determining a video bitrate according to this embodiment of the present disclosure, a computer device selects a specific quantity of target video frames from a to-be-transcoded video, which can reduce operations in a process of determining a bitrate; determines a pre-estimated video bitrate of the to-be-transcoded video according to bitrate feature information of the target video frames; obtains a relative relationship between the pre-estimated video bitrate and an actual video bitrate of the to-be-transcoded video; and obtains a target video bitrate of the to-be-transcoded video according to the relative relationship and bitrate requirement information of a target service platform. Therefore, the video bitrate of the to-be-transcoded video can be rapidly determined according to complexity of the video.

In an embodiment, the bitrate feature information includes quantization factors, and the quantization factor is used to represent a quantization degree of a corresponding target video frame. The operation of determining a pre-estimated video bitrate of the to-be-transcoded video according to bitrate feature information of the target video frames includes: determining a frame quantity of the selected target video frames; obtaining a mean quantization factor according to the quantization factors and the frame quantity; and obtaining the pre-estimated video bitrate according to the mean quantization factor.

In a video transcoding process, video frame information on which video conversion has been performed requires quantization. The quantization is a process of reducing a quantity of bits for describing each coefficient, that is, each coefficient is described by using a relatively coarse bitrate measurement unit. The bitrate measurement unit may represent a quantization degree. A larger bitrate measurement unit indicates a higher quantization degree, and a smaller bitrate measurement unit indicates a lower quantization degree. For example, there are the following two quantization manners at different quantization degrees: a quantization manner a, in which 1 to 5 is represented by using 1 (a measurement unit is 5), and 5 to 10 is represented by using 2; and a quantization manner b, in which 1 to 10 is represented by using 1 (a measurement unit 10), and 10 to 20 is represented by using 2. The manner b has a higher quantization degree than the manner a, and the quantization degree may be represented by using the quantization factor.

In an embodiment, a quantization factor of each target video frame may be represented by using $QP_i$. Assuming that there are M target video frames, the mean quantization factor $QP_{mean}$ may be calculated by using the following formula:

$$QP_{mean} = \left(\sum_{i \in M} QP_i\right)/M$$

In the foregoing embodiment, the computer device determines the pre-estimated video bitrate according to the quantization factor. As the quantization factor can well represent the bitrate information of the video, the pre-estimated video bitrate can be rapidly determined in a simple manner.

In an embodiment, the operation of obtaining the pre-estimated video bitrate according to the mean quantization factor includes: obtaining an intermediate bitrate value by using a pre-determined constant as a base and the mean quantization factor as an exponent; and multiplying the intermediate bitrate value by a first adjustment parameter, to obtain the pre-estimated video bitrate, the first adjustment parameter being determined according to resolution of the to-be-transcoded video.

The first adjustment parameter $k_1$ may be determined according to resolution and experience. Generally, a larger resolution indicates a larger $k_1$. Specifically, 5000 may be obtained for a resolution of 1920×1080.

Specifically, the pre-estimated video bitrate $Bitrate_{judge}$ may be calculated by using the following formula:

$$Bitrate_{judge} = k_1 \times 0.5^{QP_{mean}}$$

In an embodiment, in a process of determining the pre-estimated video bitrate, the computer device may further perform adjustment according to another parameter. For example, the exponent is adjusted by using a parameter $\delta$, to obtain a more accurate pre-estimated video bitrate. $\delta$ may be a constant determined according to experience, for example, $\delta$ may be 6.0.

In an embodiment, the computer device may alternatively calculate the pre-estimated video bitrate $Bitrate_{judge}$ by using the following formula:

$$Bitrate_{judge} = k_1 \times 0.5^{(QP_{mean}/5-\delta)}$$

In this embodiment of the present disclosure, the computer device determines the pre-estimated video bitrate according to the quantization factor. As the calculated mean quantization factor can represent the bitrate information of the to-be-transcoded video, the obtained pre-estimated video bitrate may be used to represent the bitrate of the to-be-transcoded video.

In an embodiment, before the operation of determining a pre-estimated video bitrate of the to-be-transcoded video according to bitrate feature information of the target video frames, the method further includes: performing entropy decoding on the target video frames; and determining the quantization factors according to the target video frames on which entropy decoding has been performed.

The obtained quantization factors may be stored in a data stream of the to-be-transcoded video. When the video bitrate of the to-be-transcoded video needs to be determined, a corresponding quantization factor may be obtained from the data stream.

In this embodiment, the computer device performs entropy decoding on the target video frames, and determines the quantization factors according to the target video frames on which entropy decoding has been performed, so that the quantization factors of the target video frames can be determined better.

In some embodiments, the computer device may also determine motion vector residuals and intra-frame prediction proportions according to the target video frames on which entropy decoding has been performed, to complete a subsequent process of determining the target video bitrate.

In an embodiment, the operation of obtaining a first relative relationship between the pre-estimated video bitrate and an actual video bitrate of the to-be-transcoded video includes: obtaining a pre-determined second adjustment parameter and third adjustment parameter, the second adjustment parameter being less than the third adjustment parameter; multiplying the pre-estimated video bitrate by the second adjustment parameter and the third adjustment parameter respectively, to obtain a first weighted pre-estimated video bitrate and a second weighted pre-estimated video bitrate; and comparing the first weighted pre-estimated video bitrate and the second weighted pre-estimated video bitrate with the actual video bitrate, and obtaining the first relative relationship according to a comparison result.

Values of the second adjustment parameter $k_2$ and the third adjustment parameter $k_3$ may be determined according to an actual situation. For example, the second adjustment parameter $k_2$ is 0.5, and the third adjustment parameter $k_3$ is 1.5.

In an embodiment, the first relative relationship may be represented by using $Skip_{dec}$. In an embodiment, the operation of obtaining the first relative relationship according to a comparison result includes: when the actual video bitrate is greater than the first weighted pre-estimated video bitrate and less than the second weighted pre-estimated video bitrate, determining the first relative relationship as a video bitrate difference being small; when the actual video bitrate is less than or equal to the first weighted pre-estimated video bitrate, determining the first relative relationship as a video bitrate difference being large; and when the actual video bitrate is greater than or equal to the second weighted pre-estimated video bitrate, determining the first relative relationship as a video bitrate difference being large.

Specifically, $Bitrate_{in}$ represents the actual video bitrate, $k_2Bitrate_{judge}$ represents the first weighted pre-estimated video bitrate, and $k_3Bitrate_{judge}$ represents the second weighted pre-estimated video bitrate.

A formula for determining the first relative relationship may be as follows:

$$skip_{dec} = \begin{cases} 1 & k_2Bitrate_{judge} < Bitrate_{in} < k_3Bitrate_{judge} \\ 0 & k_2Bitrate_{judge} \geq Bitrate_{in} \text{ or } k_3Bitrate_{judge} \leq Bitrate_{in} \end{cases}$$

$Skip_{dec}=1$ represents a video bitrate difference being small, and $Skip_{dec}=0$ represents a video bitrate difference being large.

In the foregoing embodiment, the computer device adjusts the pre-estimated video bitrate by using the adjustment parameters for comparison with the real video bitrate, and can determine values of different adjustment parameters according to a requirement to obtain different first relative relationships, thereby satisfying an adaptive transcoding requirement.

In an embodiment, the operation of determining a target video bitrate of the to-be-transcoded video according to the first relative relationship and bitrate requirement information of a target service platform includes: obtaining a reference video bitrate satisfying the bitrate requirement information; when the first relative relationship is a video bitrate difference being small, determining the reference video bitrate as the target video bitrate; and when the first relative relationship is a video bitrate difference being large, obtaining decoding complexity information of the target video frames, determining a candidate video bitrate of the to-be-transcoded video according to the decoding complexity information, and determining the target video bitrate according to the candidate video bitrate.

For the reference video bitrate $Br_o$, video quality corresponding to $Br_o$ satisfying the bitrate requirement information can be satisfactory, while no excessive bandwidth is consumed, thereby meeting a service requirement. For example, a video in Comments generally has an initial transcoding bitrate of 1.6 Mbps.

The decoding complexity information is information that can represent video texture complexity of the video in a decoding process, which may include an intra-frame prediction proportion Intra, a motion vector residual Mvd, and the like.

In this embodiment, if the video bitrate difference is small, the computer device directly determines the reference video bitrate as the target video bitrate, that is, processing such as decoding does not need to be performed on the target video frames, thereby effectively improving efficiency in determining a video bitrate. Alternatively, if the video bitrate difference is large, the computer device determines a new video bitrate (that is, the candidate video bitrate) according to the feature information of the target video frames, to determine a final target video bitrate. Therefore, the target video bitrate can be determined pertinently according to video quality of the to-be-transcoded video, and the target video bitrate meets a requirement.

In an embodiment, the decoding complexity information includes motion vector residuals and intra-frame prediction proportions, the motion vector residual is used to represent a relative relationship between a current decoded block and a corresponding predicted block of an adjacent frame, and the intra-frame prediction proportion is used to represent a proportion of decoded blocks in an intra-frame prediction mode in decoded blocks of a corresponding target video frame. The operation of determining a candidate video bitrate of the to-be-transcoded video according to the decoding complexity information includes: determining a frame quantity of the selected target video frames; obtaining a motion vector residual mean of the target video frames according to the motion vector residuals and the frame quantity; obtaining a mean intra-frame prediction proportion of the target video frames according to the intra-frame prediction proportions and the frame quantity; and obtaining the candidate video bitrate according to the reference video bitrate, the motion vector residual mean, and the mean intra-frame prediction proportion.

In this embodiment of the present disclosure, the computer device calculates the candidate video bitrate based on the motion vector residual mean $Mvd_{mean}$ and the mean intra-frame prediction proportion $Intra_{mean}$. Generally, a more complex video scenario indicates a higher value of $Mvd_{mean}$. $Intra_{mean}$ represents a proportion at which the intra-frame prediction mode is selected during video coding. Generally, more complex video texture content indicates a higher proportion at which the intra-frame prediction mode is selected.

In an embodiment, the computer device may calculate the motion vector residual mean $Mvd_{mean}$ and the mean intra-frame prediction proportion $Intra_{mean}$ by using the following formulas respectively:

$$Mvd_{mean} = \left(\sum_{i \in M} Mvd_i\right)/M$$

$$Intra_{mean} = \left(\sum_{i \in M} Intra_i\right)/M$$

In an embodiment, the candidate video bitrate $Br_{trans}$ may be determined by using the following formula:

$$Br_{trans} = \frac{Mvd_{mean} Intra_{mean}}{T} Br_o$$

T is a constant coefficient, and may be adjusted according to an actual application scenario.

In an embodiment, the operation of determining the target video bitrate according to the candidate video bitrate includes: obtaining a pre-determined critical bitrate value, the critical bitrate value being determined according to at least one of bandwidth information and video quality information of the target service platform, and being used to represent a value range of the target video bitrate; and determining the target video bitrate according to a second relative relationship between the critical bitrate value and the candidate video bitrate.

The critical bitrate value is a bitrate that needs to be satisfied by a final transcoded video, that is, a target bitrate needs to be within a range corresponding to the critical bitrate value. Such a processing manner can reduce a video bitrate of a to-be-transcoded video with excessively high video quality, and increase a video bitrate of a to-be-transcoded video with excessively low video quality.

The bandwidth information may be a requirement of a network environment of the target service platform on a network bandwidth. The video quality information may be a requirement of the target service platform on a definition, a sound effect, texture complexity, or the like of a video.

In an embodiment, the critical bitrate value includes a maximum video bitrate and a minimum video bitrate. The operation of determining the target video bitrate according to a second relative relationship between the critical bitrate value and the candidate video bitrate includes: when the candidate video bitrate is greater than the minimum video bitrate and less than the maximum video bitrate, determining the candidate video bitrate as the target video bitrate; when the candidate video bitrate is less than or equal to the minimum video bitrate, determining the minimum video bitrate as the target video bitrate; and when the candidate video bitrate is greater than or equal to the maximum video bitrate, determining the maximum video bitrate as the target video bitrate.

A specific formula for determining the target video bitrate $Br_{final}$ may be as follows:

$$Br_{final} = \begin{cases} Br_{trans} & Br_{min} < Br_{trans} < Br_{max} \\ Br_{min} & Br_{min} \geq Br_{trans} \\ Br_{max} & Br_{max} \leq Br_{trans} \end{cases}$$

The operation of obtaining a pre-determined critical bitrate value includes: determining the maximum video bitrate according to the bandwidth information of the target service platform; and determining the minimum video bitrate according to the video quality information of the target service platform. Specifically, the maximum bitrate $Br_{max}$ is mainly determined according to a bandwidth limit and experience. For example, a service requires a maximum uploading rate not to exceed 3.2 Mbps, then the maximum bitrate $Br_{max}$ may be set to 3.2 Mbps. The minimum bitrate $Br_{min}$ is also determined according to experience and a service requirement. To ensure a requirement on video quality, the minimum bitrate also needs to be guaranteed, for example, set to 0.6 Mbps. In an embodiment, the maximum bitrate may alternatively be determined according to the video quality information, and the minimum bitrate may alternatively be determined according to the bandwidth information.

In an embodiment, after the operation of determining a target video bitrate of the to-be-transcoded video according to the first relative relationship and bitrate requirement information of a target service platform, the method further includes: transcoding the to-be-transcoded video according to the target video bitrate to obtain a transcoded video; and playing the transcoded video in the target service platform by using a client.

The client may be various types of terminal devices, which may be a smartphone, a PC, or the like. An application program corresponding to the target service platform may be installed in the client. After receiving the transcoded video, the client plays the transcoded video in an interface of the corresponding application program.

Figure 3:
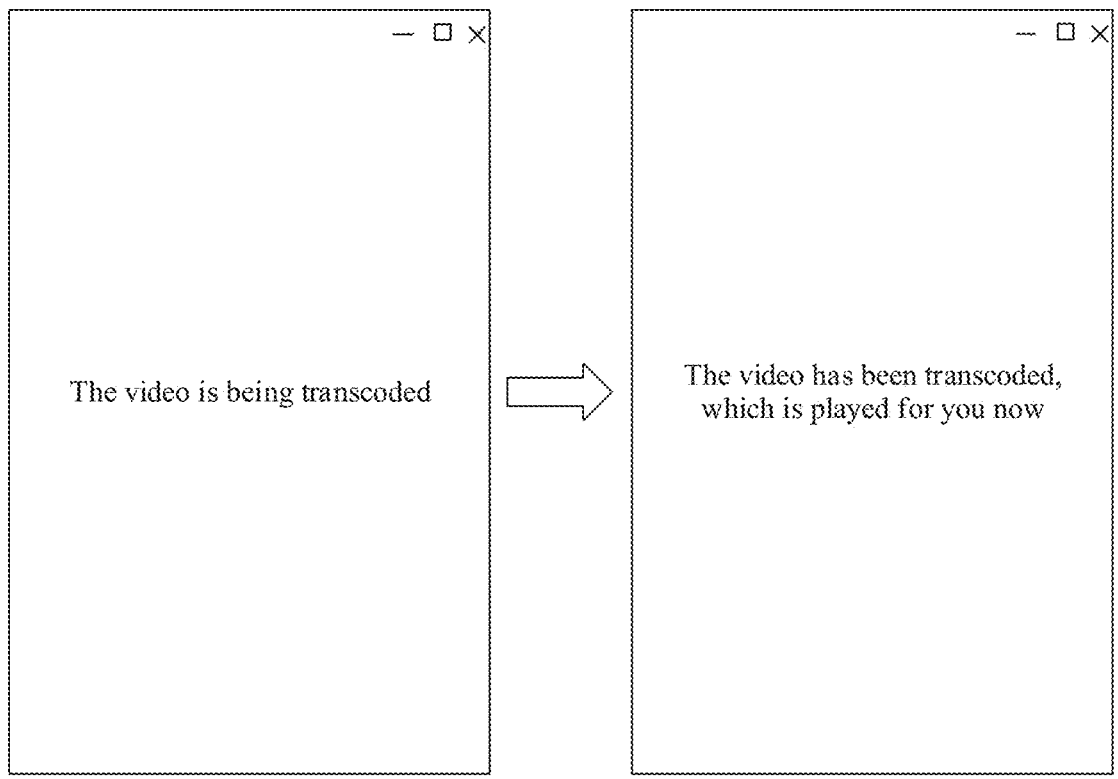
FIG. 3 is a diagram of display interfaces of transcoding prompt information according to an embodiment.

In an embodiment, in a video transcoding process, the computer device may display interface information shown on the left of FIG. 3, to prompt a user that transcoding is being performed. After the transcoding ends, the computer device may output interface information on the right of FIG. 3, such as information "The video has been transcoded, which is played for you now". Certainly, the transcoding process may alternatively be directly completed by the computer device in background, which is not displayed in a client interface. After the transcoded video is obtained, the corresponding transcoded video is directly displayed in an interface.

In some embodiments, after receiving the transcoded video, the client may further perform processing such as adjusting a video definition, in addition to playing the video.

In some embodiments, the computer device may alternatively obtain video definition selection information that is inputted in the client, and determine the target video bitrate with reference to the definition, to obtain a video required by the user, thereby improving user experience of the target service platform.

With the method for determining a video bitrate according to this embodiment, after determining the target video bitrate, the computer device plays the corresponding transcoded video on the service platform by using the client, thereby outputting the corresponding transcoded video by using the client.

Figure 4:
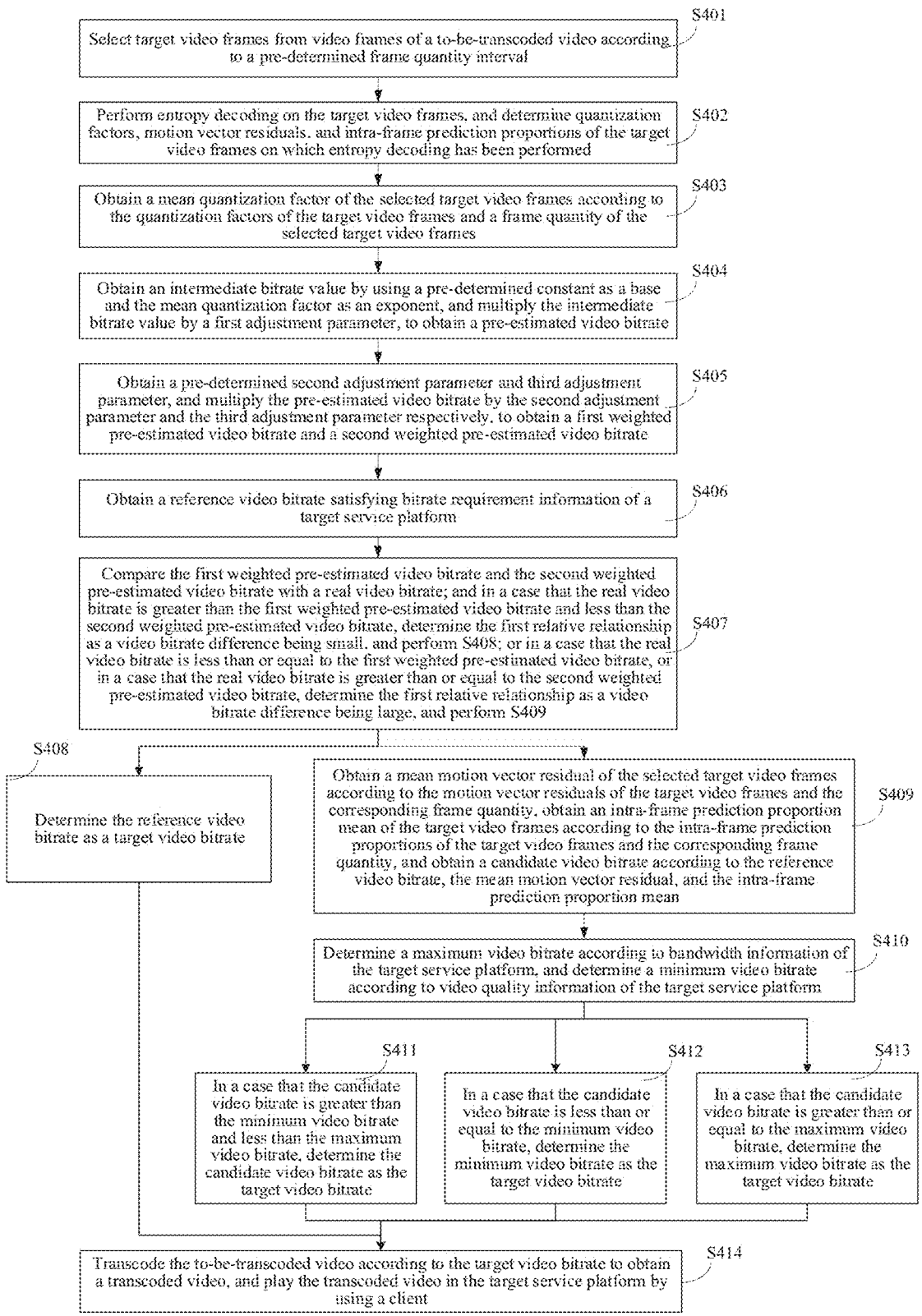
FIG. 4 is a schematic flowchart of a method for determining a video bitrate according to another embodiment.

In an embodiment, as shown in FIG. 4, a method for determining a video bitrate is provided, performed by a computer device, including the following steps:

S401. Select target video frames from video frames of a to-be-transcoded video according to a pre-determined frame quantity interval.

S402. Perform entropy decoding on the target video frames, and determine quantization factors, motion vector residuals, and intra-frame prediction proportions of the target video frames on which entropy decoding has been performed.

S403. Obtain a mean quantization factor of the selected target video frames according to the quantization factors of the target video frames and a frame quantity of the selected target video frames.

S404. Obtain an intermediate bitrate value by using a pre-determined constant as a base and the mean quantization factor as an exponent, and multiply the intermediate bitrate value by a first adjustment parameter, to obtain a pre-estimated video bitrate.

S405. Obtain a pre-determined second adjustment parameter and third adjustment parameter, the second adjustment parameter being less than the third adjustment parameter, and multiply the pre-estimated video bitrate by the second adjustment parameter and the third adjustment parameter respectively, to obtain a first weighted pre-estimated video bitrate and a second weighted pre-estimated video bitrate.

S406. Obtain a reference video bitrate satisfying bitrate requirement information of a target service platform.

S407. Compare the first weighted pre-estimated video bitrate and the second weighted pre-estimated video bitrate with an actual video bitrate; and when the actual video bitrate is greater than the first weighted pre-estimated video bitrate and less than the second weighted pre-estimated video bitrate, determine the first relative relationship as a video bitrate difference being small, and perform S408; or when the actual video bitrate is less than or equal to the first weighted pre-estimated video bitrate, or when the actual video bitrate is greater than or equal to the second weighted pre-estimated video bitrate, determine the first relative relationship as a video bitrate difference being large, and perform S409.

S408. Determine the reference video bitrate as a target video bitrate.

S409. Obtain a motion vector residual mean of the selected target video frames according to the motion vector residuals of the target video frames and the corresponding frame quantity, obtain a mean intra-frame prediction proportion of the target video frames according to the intra-frame prediction proportions of the target video frames and the corresponding frame quantity, and obtain a candidate video bitrate according to the reference video bitrate, the motion vector residual mean, and the mean intra-frame prediction proportion.

S410. Determine a maximum video bitrate according to bandwidth information of the target service platform, and determine a minimum video bitrate according to video quality information of the target service platform.

S411. When the candidate video bitrate is greater than the minimum video bitrate and less than the maximum video bitrate, determine the candidate video bitrate as the target video bitrate.

S412. When the candidate video bitrate is less than or equal to the minimum video bitrate, determine the minimum video bitrate as the target video bitrate.

S413. When the candidate video bitrate is greater than or equal to the maximum video bitrate, determine the maximum video bitrate as the target video bitrate.

S414. Transcode the to-be-transcoded video according to the target video bitrate to obtain a transcoded video, and play the transcoded video in the target service platform by using a client.

With the method for determining a video bitrate according to foregoing embodiment, a computer device selects a specific quantity of target video frames from a to-be-transcoded video according to a frame quantity interval, which can reduce operations in a process of determining a bitrate; determines a pre-estimated video bitrate of the to-be-transcoded video according to bitrate feature information of the target video frames; obtains a relative relationship between the pre-estimated video bitrate and an actual video bitrate of the to-be-transcoded video; and obtains a target video bitrate of the to-be-transcoded video according to the relative relationship and bitrate requirement information of a target service platform. Therefore, the video bitrate of the to-be-transcoded video can be rapidly determined according to complexity of the video.

Figure 5:
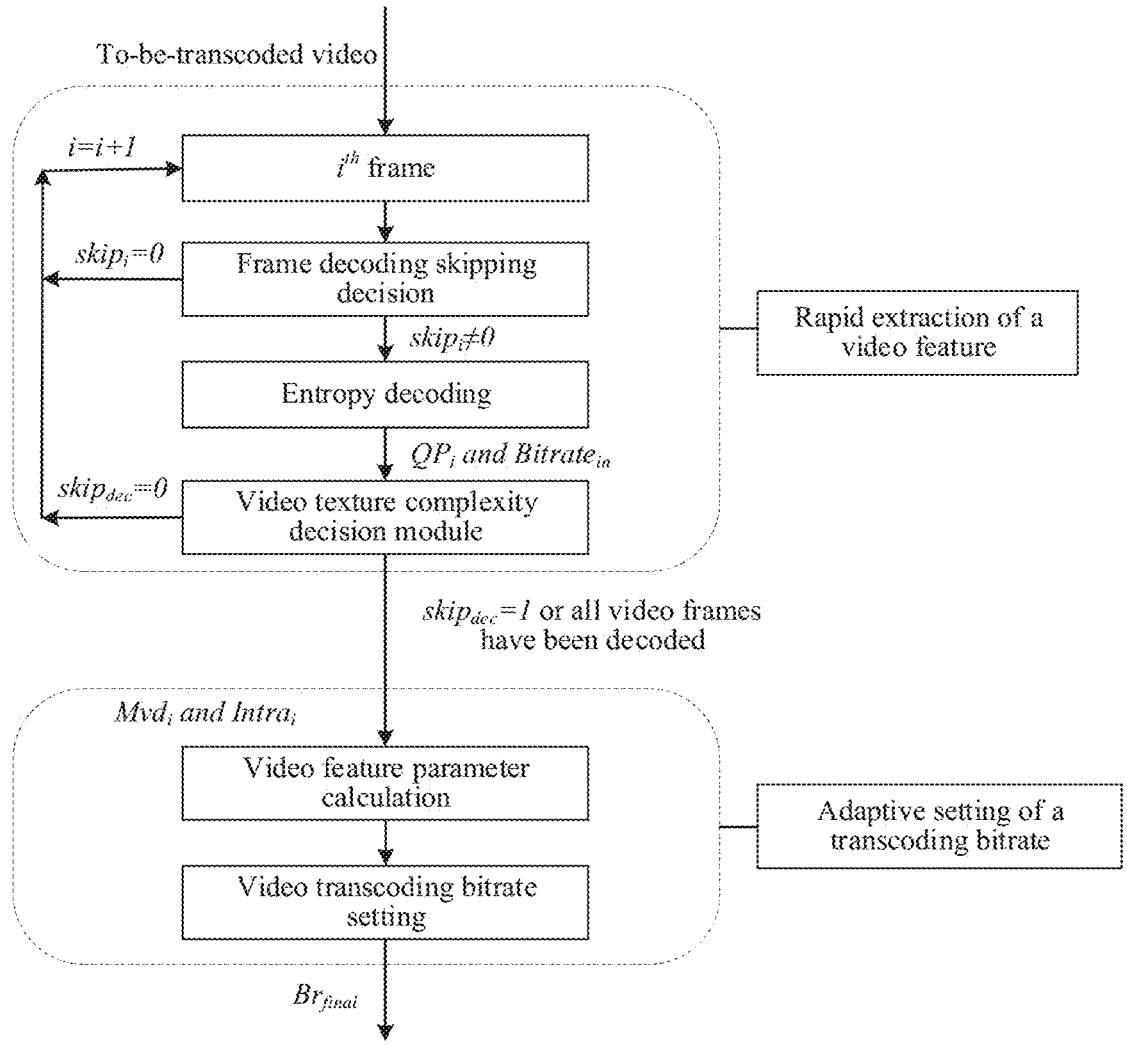
FIG. 5 is a schematic flowchart of a method for determining a video bitrate according to still another embodiment.
Figure 6:
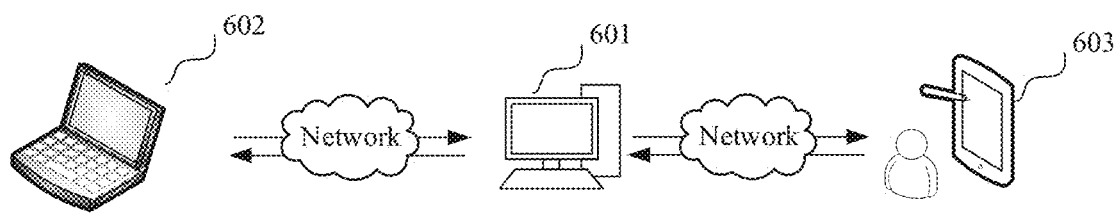
FIG. 6 is a structural block diagram of an apparatus for determining a video bitrate according to an embodiment.

To better understand the foregoing method, referring to FIG. 5, an application instance of a method for determining a video bitrate according to an embodiment of the present disclosure is elaborated. An actual scenario of the application instance may be shown in FIG. 6. The method for determining a video bitrate is applied to a terminal device 601. The terminal device 601 receives a to-be-transcoded video uploaded by a client 602, determines a target video bitrate of the to-be-transcoded video, transcodes the to-be-transcoded video based on the target video bitrate, to obtain a transcoded video, and plays the transcoded video in a client 603.

1. Rapid Extraction of a Video Sequence Feature

The terminal device 601 obtains the to-be-transcoded video uploaded by the client 602, and extracts video frames in the to-be-transcoded video.

Frame skipping decision is performed on video frames of the to-be-transcoded video by using the following formula:

$$\text{skip}_i = \begin{cases} 1 & i \% N = 0 \\ 0 & i \% N \neq 0 \end{cases}$$

"%" means obtaining a remainder, i represents a number of a current studied frame, $\text{skip}_i=1$ means to be decoded, and $\text{skip}_i=0$ means skipped.

Corresponding entropy decoding is performed on a to-be-decoded $i^{th}$ frame as a target video frame, to obtain a quantization factor $QP_i$, a motion vector residual $Mvd_i$, and an intra-frame prediction proportion $Intra_i$ corresponding to each target video frame. An ultimate goal of normal video decoding is to reconstruct a compressed video data stream into a video image that can be displayed in an interface. To complete reconstruction of the final video image, dequantization, inverse conversion, intra-frame prediction, motion compensation, and loop filtering are all necessary decoding processes. However, an objective of this embodiment of the present disclosure is to perform adaptive bitrate decision based on parameters, whose ultimate goal is not to reconstruct a video image. Therefore, the terminal device only needs to extract parameters such as the quantization factor $QP_i$, the motion vector residual $Mvd_i$, and the intra-frame prediction proportion $Intra_i$.

To effectively reduce algorithm complexity, and rapidly determine whether adaptive bitrate adjustment needs to be performed on the video, extracted coding parameters are inputted to a video texture complexity decision module. If a video frame satisfies a decision principle ($skip_{dec}=1$), decoding of the remaining video frames is skipped, to directly start a transcoding bitrate setting stage; otherwise, information is further extracted from another video frame, until all the video frames are decoded.

A specific decision process is as follows:

First, a mean quantization factor $QP_{mean}$ of M frames decoded above is calculated:

$$QP_{mean} = \left(\sum_{i \in M} QP_i\right)/M$$

A possible bitrate value (that is, a pre-estimated video bitrate) $Bitrate_{judge}$ of the to-be-transcoded video is estimated according to the mean quantization factor $QP_{mean}$:

$$Bitrate_{judge} = k_1 \times 0.5^{(QP_{mean}/5-\delta)}$$

$k_1$ and $\delta$ are adjustment parameters.

Whether decoding needs to be skipped is determined according to a first relative relationship between an actual video bitrate $Bitrate_{in}$ and the pre-estimated video bitrate $Bitrate_{judge}$ of the to-be-transcoded video, which is specifically shown in the following formula, $k_2$ and $k_3$ being corresponding adjustment parameters:

$$skip_{dec} = \begin{cases} 1 & k_2 Bitrate_{judge} < Bitrate_{in} < k_3 Bitrate_{judge} \\ 0 & k_2 Bitrate_{judge} \geq Bitrate_{in} \text{ or } k_3 Bitrate_{judge} \leq Bitrate_{in} \end{cases}$$

$Skip_{dec}$ physically means whether a next decoding process needs to be skipped, 1 means to be skipped, and 0 means not to be skipped. Herein, $Skip_{dec}$ may be considered as coarse texture complexity decision based on the first relative relationship between the estimated video bitrate and the actual video bitrate, to determine whether decoding needs to be skipped.

2. Adaptive Setting of a Transcoding Bitrate

First, corresponding video feature parameter calculation is performed, to obtain a motion vector residual mean $Mvd_{mean}$ and a mean intra-frame prediction proportion $Intra_{mean}$. Formulas are as follows:

$$Mvd_{mean} = \left(\sum_{i \in M} Mvd_i\right)/M$$

$$Intra_{mean} = \left(\sum_{i \in M} Intra_i\right)/M$$

Next, a transcoding bitrate setting stage starts. A scenario of a target service platform in the client 603 is determined, and a video transcoding requirement is determined, to determine an initial bitrate $Br_o$, a maximum bitrate $Br_{max}$, and a minimum bitrate $Br_{min}$.

For a video sequence that is directly determined to be skipped, that is, $skip_{dec}=1$, in the preliminary texture complexity decision stage during the video feature extraction, a transcoding bitrate of the video sequence is directly set to the initial bitrate $Br_o$; otherwise, the transcoding bitrate is set and adjusted according to a mean of the entire video.

Specifically, the transcoding bitrate is first calculated based on the motion vector residual mean and the mean intra-frame prediction proportion. $Mvd_{mean}$ represents the motion vector residual mean, and generally, a more complex video scenario indicates a higher value of $Mvd_{mean}$. $Intra_{mean}$ represents the mean intra-frame prediction proportion during video coding, and generally, more complex video texture content indicates a higher mean intra-frame prediction proportion. The bitrate is correspondingly set and adjusted according to the two.

$$Br_{trans} = \frac{Mvd_{mean} Intra_{mean}}{T} Br_o$$

T is a constant coefficient.

A final target transcoding bitrate $Br_{final}$ to be set is obtained according to limits of maximum and minimum bitrates:

$$Br_{final} = \begin{cases} Br_o & Skip_{dec} = 1 \\ Br_{trans} & Skip_{dec} = 0 \text{ and } Br_{min} < Br_{trans} < Br_{max} \\ Br_{min} & Skip_{dec} = 0 \text{ and } Br_{min} \geq Br_{trans} \\ Br_{max} & Skip_{dec} = 0 \text{ and } Br_{max} \leq Br_{trans} \end{cases}$$

The to-be-transcoded video is transcoded according to the target transcoding bitrate, to obtain a transcoded video whose bitrate is the target transcoding bitrate, and the transcoded video is sent to the client 603, to play the transcoded video in the target service platform of the client 603.

With the method for determining a video bitrate according to this embodiment of the present disclosure, adaptive setting of a video transcoding bitrate can be rapidly implemented, thereby effectively improving quality of a transcoded video, and effectively reducing calculation complexity caused by pre-analysis for bitrate setting.

It is to be understood that the steps are not necessarily performed sequentially in a sequence indicated by step numbers. Unless otherwise explicitly specified in this application, execution of the steps is not strictly limited, and the steps may be performed in other sequences. Moreover, at least some of the steps in each embodiment may include a plurality of steps or a plurality of stages. The steps or stages are not necessarily performed at the same moment but may be performed at different moments. The steps or stages are not necessarily performed sequentially, but may be performed in turn or alternately with another step or at least some of steps or stages for the another step.

Based on the same idea as the method for determining a video bitrate in the foregoing embodiment, an embodiment of the present disclosure further provides an apparatus for determining a video bitrate. The apparatus may be configured to perform the method for determining a video bitrate. For ease of description, a schematic structural diagram of an embodiment of the apparatus for determining a video bitrate shows only parts related to the embodiments of the present disclosure. A person skilled in the art may understand that a structure shown in the diagram does not constitute a limitation to the apparatus, and the apparatus may include more or fewer components than those shown in the diagram, or some components may be combined, or a different component deployment may be used.

Figure 7:
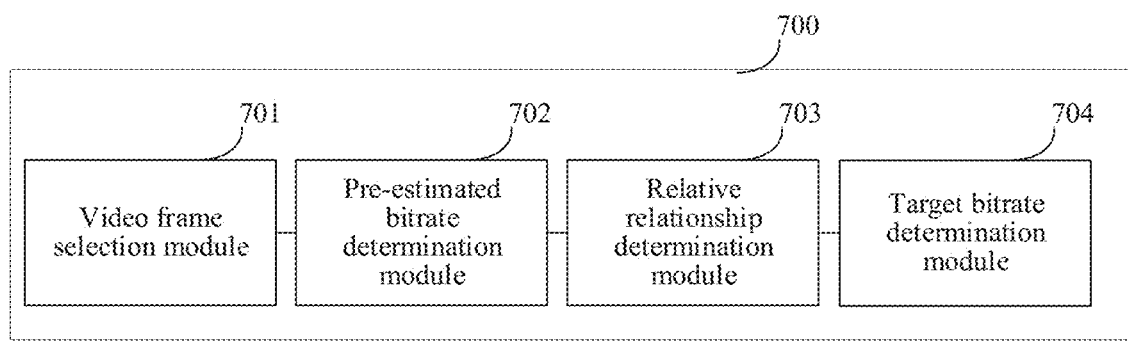

In an embodiment, as shown in FIG. 7, an apparatus for determining a video bitrate is provided, including a video frame selection module 701, a pre-estimated bitrate determination module 702, a relative relationship determination module 703, and a target bitrate determination module 704, which are detailed as follows:

The video frame selection module 701 is configured to select target video frames from video frames of a to-be-transcoded video according to a predefined interval.

The pre-estimated bitrate determination module 702 is configured to determine a pre-estimated video bitrate of the to-be-transcoded video according to bitrate feature information of the target video frames.

The relative relationship determination module 703 is configured to obtain a first relative relationship between the pre-estimated video bitrate and an actual video bitrate of the to-be-transcoded video.

The target bitrate determination module 704 is configured to determine a target video bitrate of the to-be-transcoded video according to the first relative relationship and bitrate requirement information of a target service platform, the target service platform being a service platform to which the to-be-transcoded video is applied after being transcoded.

With the apparatus for determining a video bitrate according to this embodiment, a specific quantity of target video frames are selected from a to-be-transcoded video according to a frame quantity interval, which can reduce operations in a process of determining a bitrate; a pre-estimated video bitrate of the to-be-transcoded video is determined according to bitrate feature information of the target video frames; a relative relationship between the pre-estimated video bitrate and an actual video bitrate of the to-be-transcoded video is obtained; and a target video bitrate of the to-be-transcoded video is obtained according to the relative relationship and bitrate requirement information of a target service platform. Therefore, the video bitrate of the to-be-transcoded video can be rapidly determined according to complexity of the video.

In an embodiment, the bitrate feature information includes quantization factors, and the quantization factor is used to represent a quantization degree of a corresponding target video frame. The pre-estimated bitrate determination module includes: a frame quantity determination submodule, configured to determine a frame quantity of the selected target video frames; a quantization factor determination submodule, configured to obtain a mean quantization factor according to the quantization factors and the frame quantity; and a pre-estimated bitrate determination submodule, configured to obtain the pre-estimated video bitrate according to the mean quantization factor.

In an embodiment, the pre-estimated bitrate determination submodule includes: an intermediate value determination unit, configured to obtain an intermediate bitrate value by using a pre-determined constant as a base and the mean quantization factor as an exponent; and a pre-estimated bitrate determination unit, configured to multiply the intermediate bitrate value by a first adjustment parameter, to obtain the pre-estimated video bitrate, the first adjustment parameter being determined according to resolution of the to-be-transcoded video.

In an embodiment, the apparatus for determining a video bitrate further includes: an entropy decoding module, configured to perform entropy decoding on the target video frames; and a quantization factor determination module, configured to determine the quantization factors according to the target video frames on which entropy decoding has been performed.

In an embodiment, the relative relationship determination module includes: an adjustment parameter determination submodule, configured to obtain a pre-determined second adjustment parameter and third adjustment parameter, the second adjustment parameter being less than the third adjustment parameter; a weighted bitrate determination submodule, configured to multiply the pre-estimated video bitrate by the second adjustment parameter and the third adjustment parameter respectively, to obtain a first weighted pre-estimated video bitrate and a second weighted pre-estimated video bitrate; and a relative relationship determination submodule, configured to compare the first weighted pre-estimated video bitrate and the second weighted pre-estimated video bitrate with the actual video bitrate, and obtain the first relative relationship according to a comparison result.

In an embodiment, the relative relationship determination submodule includes: a first relationship determination unit, configured to: when the actual video bitrate is greater than the first weighted pre-estimated video bitrate and less than the second weighted pre-estimated video bitrate, determine the first relative relationship as a video bitrate difference being small; a second relationship determination unit, configured to: when the actual video bitrate is less than or equal to the first weighted pre-estimated video bitrate, determine the first relative relationship as a video bitrate difference being large; and a third relationship determination unit, configured to: when the actual video bitrate is greater than or equal to the second weighted pre-estimated video bitrate, determine the first relative relationship as a video bitrate difference being large.

In an embodiment, the target bitrate determination module includes: a reference bitrate determination submodule, configured to obtain a reference video bitrate satisfying the bitrate requirement information; a first target bitrate determination submodule, configured to: when the first relative relationship is a video bitrate difference being small, determine the reference video bitrate as the target video bitrate; and a second target bitrate determination submodule, configured to: when the first relative relationship is a video bitrate difference being large, obtain decoding complexity information of the target video frames, determine a candidate video bitrate of the to-be-transcoded video according to the decoding complexity information, and determine the target video bitrate according to the candidate video bitrate.

In an embodiment, the decoding complexity information includes motion vector residuals and intra-frame prediction proportions, the motion vector residual is used to represent a relative relationship between a current decoded block and a corresponding predicted block of an adjacent frame, and the intra-frame prediction proportion is used to represent a proportion of decoded blocks in an intra-frame prediction mode in decoded blocks of a corresponding target video frame. The second target bitrate determination submodule includes: a frame quantity determination unit, configured to determine a frame quantity of the selected target video frames; a motion vector residual determination unit, configured to obtain a motion vector residual mean of the target video frames according to the motion vector residuals and the frame quantity; an intra-frame prediction proportion determination unit, configured to obtain a mean intra-frame prediction proportion of the target video frames according to the intra-frame prediction proportions and the frame quantity; and a candidate bitrate determination unit, configured to obtain the candidate video bitrate according to the reference video bitrate, the motion vector residual mean, and the mean intra-frame prediction proportion.

In an embodiment, the second target bitrate determination submodule includes: a critical value obtaining unit, configured to obtain a pre-determined critical bitrate value, the critical bitrate value being determined according to at least one of bandwidth information and video quality information of the target service platform, and being used to represent a value range of the target video bitrate; and a target bitrate determination unit, configured to determine the target video bitrate according to a second relative relationship between the critical bitrate value and the candidate video bitrate.

In an embodiment, the critical bitrate value includes a maximum video bitrate and a minimum video bitrate. The target bitrate determination unit includes: a first target bitrate determination subunit, configured to: when the candidate video bitrate is greater than the minimum video bitrate and less than the maximum video bitrate, determine the candidate video bitrate as the target video bitrate; a second target bitrate determination subunit, configured to: when the candidate video bitrate is less than or equal to the minimum video bitrate, determine the minimum video bitrate as the target video bitrate; and a third target bitrate determination subunit, configured to: when the candidate video bitrate is greater than or equal to the maximum video bitrate, determine the maximum video bitrate as the target video bitrate.

In an embodiment, the critical value obtaining unit includes: a maximum bitrate obtaining subunit, configured to determine the maximum video bitrate according to the bandwidth information of the target service platform; and a minimum bitrate obtaining subunit, configured to determine the minimum video bitrate according to the video quality information of the target service platform.

In an embodiment, the apparatus for determining a video bitrate further includes: a transcoding module, configured to transcode the to-be-transcoded video according to the target video bitrate to obtain a transcoded video; and a video playing module, configured to play the transcoded video in the target service platform by using a client.

The apparatus for determining a video bitrate in the embodiments of the present disclosure corresponds to the method for determining a video bitrate in the embodiments of the present disclosure. The technical features and beneficial effects described in the foregoing embodiments of the method for determining a video bitrate are applicable to the embodiments of the apparatus for determining a video bitrate. For details, refer to descriptions in the method embodiments of the present disclosure, which is hereby declared.

In addition, in the exemplary implementations of the apparatus for determining a video bitrate, the logical division of the program modules is merely an example for description. In actual applications, based on a requirement, for example, considering a configuration requirement of corresponding hardware or for convenience of software implementation, the foregoing functions may be allocated to and completed by different function modules, that is, an internal structure of the apparatus for determining a video bitrate is divided into different program modules to complete all or some of the functions described above.

In an embodiment, the apparatus for determining a video bitrate according to this application may be implemented in a form of computer-readable instructions. The computer-readable instructions may be run on the computer device shown in FIG. 1. The memory of the computer device may store program modules forming the apparatus for determining a video bitrate, such as the video frame selection module, the pre-estimated bitrate determination module, the relative relationship determination module, and the target bitrate determination module shown in FIG. 7. The computer-readable instructions formed by the program modules cause the processor to perform operations in the method for determining a video bitrate in the embodiments of this application described in the specification.

For example, the computer device shown in FIG. 1 may perform S201 by using the video frame selection module in the apparatus for determining a video bitrate shown in FIG. 7, perform S202 by using the pre-estimated bitrate determination module, perform S203 by using the relative relationship determination module, and perform S204 by using the target bitrate determination module.

In an embodiment, a computer device is provided, including a memory and a processor, the memory storing computer-readable instructions, and the computer-readable instructions, when executed by the processor, causing the processor to perform operations of the method for determining a video bitrate. The operations of the method for determining a video bitrate herein may be steps in the method for determining a video bitrate in the foregoing embodiments.

In an embodiment, a non-transitory computer-readable storage medium is provided, storing computer-readable instructions, the computer-readable instructions, when executed by a processor, causing the processor to perform operations of the method for determining a video bitrate. The operations of the method for determining a video bitrate herein may be steps in the method for determining a video bitrate in the foregoing embodiments.

In an embodiment, a computer-readable instruction product or computer-readable instructions are provided, the computer-readable instruction product or the computer-readable instructions including computer instructions, and the computer instructions being stored in a non-transitory computer-readable storage medium. The processor of the computer device reads the computer instructions from the computer-readable storage medium, and the processor executes the computer-readable instructions, to cause the computer device to perform the steps in the method embodiments.

A person of ordinary skill in the art may understand that all or some procedures in the methods in the foregoing embodiments may be implemented by a computer-readable instruction instructing relevant hardware. The program may be stored in a non-transitory computer-readable storage medium. When the program is executed, the procedures of the foregoing method embodiments may be implemented. Any reference to a memory, a storage, a database, or another medium used in the embodiments provided in this application may include at least one of a non-volatile memory and a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing embodiments only describe several implementations of this application, which are described specifically and in detail, but cannot be construed as a limitation to the patent scope of this application. A person of ordinary skill in the art may further make several variations and improvements without departing from the idea of this application, and the variations and improvements all fall within the protection scope of this application. Therefore, the patent protection scope of this application shall be subject to the appended claims.

What is claimed is:

1. A method for determining a video bitrate for a to-be-transcoded video performed by a computer device, the method comprising:
    selecting target video frames from video frames of the to-be-transcoded video;
    determining bitrate feature information of the target video frames, wherein the bitrate feature information comprises quantization factors of the target video frames;
    determining a frame quantity of the target video frames;
    obtaining a mean quantization factor according to the quantization factors and the frame quantity;
    obtaining a pre-estimated video bitrate of the target video frames according to the mean quantization factor; and
    determining a target video bitrate of the to-be-transcoded video according to the pre-estimated video bitrate of the target video frames and bitrate requirement information of a target service platform.

2. The method according to claim 1, wherein the operation of obtaining the pre-estimated video bitrate according to the mean quantization factor comprises:
    obtaining an intermediate bitrate value by using a pre-determined constant as a base and the mean quantization factor as an exponent; and
    multiplying the intermediate bitrate value by a first adjustment parameter, to obtain the pre-estimated video bitrate, the first adjustment parameter being determined according to resolution of the to-be-transcoded video.

3. The method according to claim 1, wherein before the operation of determining the pre-estimated video bitrate of the to-be-transcoded video according to bitrate feature information of the target video frames, the method further comprises:
    performing entropy decoding on the target video frames; and
    determining the quantization factors according to the target video frames on which entropy decoding has been performed.

4. The method according to claim 1, wherein the method further comprises:
    obtaining a pre-determined second adjustment parameter and third adjustment parameter, the second adjustment parameter being less than the third adjustment parameter;
    multiplying the pre-estimated video bitrate by the second adjustment parameter and the third adjustment parameter respectively, to obtain a first weighted pre-estimated video bitrate and a second weighted pre-estimated video bitrate; and
    comparing the first weighted pre-estimated video bitrate and the second weighted pre-estimated video bitrate with the actual video bitrate, and obtaining a first relative relationship between the pre-estimated video bitrate and an actual video bitrate of the to-be-transcoded video according to a comparison result.

5. The method according to claim 1, wherein the method further comprises:
    transcoding the to-be-transcoded video according to the target video bitrate to obtain a transcoded video; and
    playing the transcoded video in the target service platform by using a client.

6. A computer device, comprising a memory and a processor, the memory storing computer-readable instructions that, when executed by the processor, cause the computer device to perform a method for determining a video bitrate for a to-be-transcoded video, the method including:
    selecting target video frames from video frames of the to-be-transcoded video;
    determining bitrate feature information of the target video frames, wherein the bitrate feature information comprises quantization factors of the target video frames;
    determining a frame quantity of the target video frames;
    obtaining a mean quantization factor according to the quantization factors and the frame quantity;
    obtaining a pre-estimated video bitrate of the target video frames according to the mean quantization factor; and
    determining a target video bitrate of the to-be-transcoded video according to the pre-estimated video bitrate of the target video frames and bitrate requirement information of a target service platform.

7. The computer device according to claim 6, wherein the operation of obtaining the pre-estimated video bitrate according to the mean quantization factor comprises:
    obtaining an intermediate bitrate value by using a pre-determined constant as a base and the mean quantization factor as an exponent; and
    multiplying the intermediate bitrate value by a first adjustment parameter, to obtain the pre-estimated video bitrate, the first adjustment parameter being determined according to resolution of the to-be-transcoded video.

8. The computer device according to claim 6, wherein the method further comprises:
before determining the pre-estimated video bitrate of the to-be-transcoded video according to bitrate feature information of the target video frames:
performing entropy decoding on the target video frames; and
determining the quantization factors according to the target video frames on which entropy decoding has been performed.

9. The computer device according to claim 6, wherein the method further comprises:
obtaining a pre-determined second adjustment parameter and third adjustment parameter, the second adjustment parameter being less than the third adjustment parameter;
multiplying the pre-estimated video bitrate by the second adjustment parameter and the third adjustment parameter respectively, to obtain a first weighted pre-estimated video bitrate and a second weighted pre-estimated video bitrate; and
comparing the first weighted pre-estimated video bitrate and the second weighted pre-estimated video bitrate with the actual video bitrate, and obtaining a first relative relationship between the pre-estimated video bitrate and an actual video bitrate of the to-be-transcoded video according to a comparison result.

10. The computer device according to claim 6, wherein the method further comprises:
transcoding the to-be-transcoded video according to the target video bitrate to obtain a transcoded video; and
playing the transcoded video in the target service platform by using a client.

11. A non-transitory computer-readable storage medium storing one or more computer-readable instructions, the computer-readable instructions being executed by a processor of a computer device to perform a method for determining a video bitrate for a to-be-transcoded video, the method including:
selecting target video frames from video frames of the to-be-transcoded video;
determining bitrate feature information of the target video frames, wherein the bitrate feature information comprises quantization factors of the target video frames;
determining a frame quantity of the target video frames;
obtaining a mean quantization factor according to the quantization factors and the frame quantity;
obtaining a pre-estimated video bitrate of the target video frames according to the mean quantization factor; and
determining a target video bitrate of the to-be-transcoded video according to the pre-estimated video bitrate of the target video frames and bitrate requirement information of a target service platform.

12. The non-transitory computer-readable storage medium according to claim 11, wherein the operation of obtaining the pre-estimated video bitrate according to the mean quantization factor comprises:
obtaining an intermediate bitrate value by using a pre-determined constant as a base and the mean quantization factor as an exponent; and
multiplying the intermediate bitrate value by a first adjustment parameter, to obtain the pre-estimated video bitrate, the first adjustment parameter being determined according to resolution of the to-be-transcoded video.

13. The non-transitory computer-readable storage medium according to claim 11, wherein the method further comprises:
before determining the pre-estimated video bitrate of the to-be-transcoded video according to bitrate feature information of the target video frames:
performing entropy decoding on the target video frames; and
determining the quantization factors according to the target video frames on which entropy decoding has been performed.

14. The non-transitory computer-readable storage medium according to claim 11, wherein the method further comprises:
obtaining a pre-determined second adjustment parameter and third adjustment parameter, the second adjustment parameter being less than the third adjustment parameter;
multiplying the pre-estimated video bitrate by the second adjustment parameter and the third adjustment parameter respectively, to obtain a first weighted pre-estimated video bitrate and a second weighted pre-estimated video bitrate; and
comparing the first weighted pre-estimated video bitrate and the second weighted pre-estimated video bitrate with the actual video bitrate, and obtaining a first relative relationship between the pre-estimated video bitrate and an actual video bitrate of the to-be-transcoded video according to a comparison result.

15. The non-transitory computer-readable storage medium according to claim 11, wherein the method further comprises:
transcoding the to-be-transcoded video according to the target video bitrate to obtain a transcoded video; and
playing the transcoded video in the target service platform by using a client.

* * * * *